United States Patent
Kim et al.

(10) Patent No.: US 6,915,693 B2
(45) Date of Patent: Jul. 12, 2005

(54) MEMS GYROSCOPE HAVING MASS VIBRATING VERTICALLY ON SUBSTRATE

(75) Inventors: Jun-o Kim, Yongin (KR); Sang-woo Lee, Seoul (KR)

(73) Assignee: Samsung Electronics Co., Ltd., Gyunggi-do (KR)

(*) Notice: Subject to any disclaimer, the term of this patent is extended or adjusted under 35 U.S.C. 154(b) by 0 days.

(21) Appl. No.: 10/293,502

(22) Filed: Nov. 14, 2002

(65) Prior Publication Data

US 2003/0110858 A1 Jun. 19, 2003

(30) Foreign Application Priority Data

Dec. 14, 2001 (KR) ........................................ 2001-79496

(51) Int. Cl.[7] ................................................ G01P 9/04
(52) U.S. Cl. ................................ 73/504.12; 73/504.14
(58) Field of Search ........................ 73/504.12, 504.14, 73/504.02, 504.04

(56) References Cited

U.S. PATENT DOCUMENTS 5,691,471 A    11/1997  Okazaki et al.
6,349,597 B1 *  2/2002  Folkmer et al. ......... 73/504.12

2001/0022106 A1  9/2001  Kato et al.

FOREIGN PATENT DOCUMENTS

DE        196 41 284 C1     5/1998

OTHER PUBLICATIONS

Japanese Abstract No. 2000–304547, dated Nov. 2, 2000.

* cited by examiner

Primary Examiner—John E. Chapman
(74) Attorney, Agent, or Firm—Sughrue Mion, PLLC (57) ABSTRACT

X type MEMS gyroscope has a first mass vertically vibrating on a substrate and a second mass horizontally vibrating on the substrate. A driving electrode is disposed on the same surface with the first mass. The first mass can move in relation to the second mass in the vertical direction, and is fixed in relation to the second mass in the horizontal direction. The second mass is operative to be moved in a horizontal direction in relation to the substrate by a Coriolis force, which is generated by an angular velocity applied while the first mass is being vibrated. A sensing electrode measures displacement of the second mass in the horizontal direction. All moving electrodes and stationary electrodes are disposed on the same surface, and all elements are manufactured by using one mask. Therefore, adhesion between the moving and stationary electrodes is prevented and the manufacturing process is simplified.

14 Claims, 11 Drawing Sheets

MEMS GYROSCOPE HAVING MASS VIBRATING VERTICALLY ON SUBSTRATE

CROSS-REFERENCE

The present application is based on Korean Patent Application No. 2001-79496, which is incorporated herein by reference.

BACKGROUND OF THE INVENTION

1. Field of the Invention

The present invention relates to a MEMS gyroscope, and more particularly, to a MEMS gyroscope having a mass vibrating vertically on a substrate.

2. Description of the Related Art

MEMS (micro electro mechanical system) is a technology realizing mechanical and electric elements using a semiconductor process. One example of an element using MEMS technology is a gyroscope for measuring angular velocity. The gyroscope measures the angular velocity by measuring Coriolis force generated when rotation angular velocity is added to an object moving with a predetermined velocity. The Coriolis force is proportional to a cross product of the rotation angular velocity due to external force and moving velocity.

For the gyroscope to generate and sense the Coriolis force, the gyroscope has to have a mass vibrating inside of the gyroscope. Hereinbelow, a direction that the mass in the gyroscope is driven will be referred to as a 'driving direction,' a direction that the rotation velocity is input into the gyroscope will be referred to as an 'input direction,' and a direction that the Coriolis force generated in the mass is sensed will be referred to as a 'sensing direction.'

The driving direction, input direction and sensing direction are all set up in a perpendicular direction to each other. Generally, in the gyroscope using the MEMS technology, three axes of coordinates are set up composed of two directions crossing at a right angle and parallel to a surface of a substrate (hereinbelow, it will be referred to as a 'horizontal direction') and a direction vertical to the surface of the substrate (hereinbelow, it will be referred to as a 'vertical direction').

Generally, the gyroscope is divided into an X type (or Y type) gyroscope and a Z type gyroscope. The input direction of the X type gyroscope is the horizontal direction. To measure the angular velocity added in the horizontal direction by using the X type gyroscope, either the driving direction or the sensing direction should be set up as vertical direction. Therefore, the X type gyroscope should have a driving electrode to drive the mass vertically or a sensing electrode to sense vertical displacement of the mass.

Figure 1:
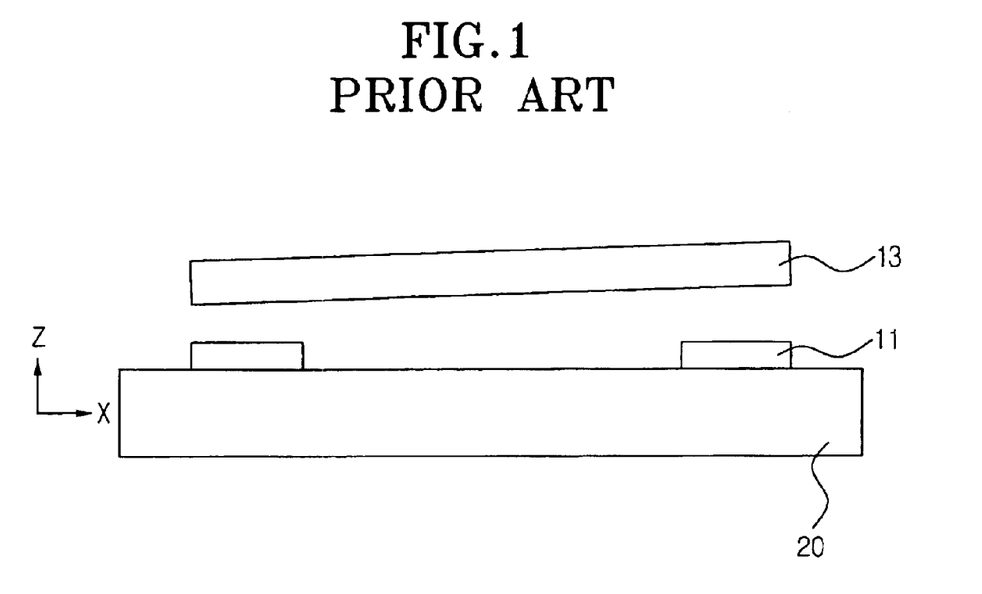
FIG. 1 is a view showing electrodes applied to a conventional MEMS gyroscope.

In the gyroscope using the MEMS technology, the driving electrode and the sensing electrode have the same physical structure. FIG. 1 is a view showing a driving electrode of vertical direction or a sensing electrode of vertical direction.

A stationary electrode 11 is mounted on the substrate 20 and a moving electrode 13 is disposed above the stationary electrode 11. The moving electrode 13 is lifted above the substrate 20 in order to be able to approach and separate to and from the stationary electrode 11.

When the above described electrode is used as a driving electrode, the voltage added between the stationary electrode 11 and the moving electrode 13 is variable, and accordingly, the moving electrode 13 is vertically vibrated in relation to the stationary electrode 11 by variable electrostatic force. When the above electrode is used as a sensing electrode, a means to sense the electrostatic force change based on the distance between the stationary electrode 11 and the moving electrode 13 is provided. The moving position of the moving electrode 13 can be obtained according to the sensed result, and Coriolis force can be obtained based on the position.

Yet, the electrode having the above structure is very difficult to manufacture as the moving electrode 13 is suspended above the upper part of the stationary electrode 11. In other words, to manufacture the above electrode, a process for forming the stationary electrode 11 on the substrate 20 is firstly operated, and then a sacrificial layer is deposited on the stationary electrode 11. After that, the moving electrode 13 is formed on the sacrificial layer, and the sacrificial layer is removed. As it is known from the above, the process to manufacture the moving electrode 13 suspended above the stationary electrode 11 involves many steps.

Moreover, to correctly measure the displacement of vertical direction of the moving electrode 13, the distance between the moving electrode 13 and the stationary electrode 11 should be narrow. Therefore, there is a problem that adhesion can be created between the moving electrode 13 and the stationary electrode 11.

Accordingly, the MEMS gyroscope having a driving electrode and a sensing electrode shown in PIG. 1 requires many steps in manufacturing and has a high possibility of malfunction due to the adhesion.

SUMMARY OF THE INVENTION

The present invention has been made to overcome the above-mentioned problems. Thus, an aspect of the present invention is to provide an X type MEMS gyroscope with easy manufacturability and less malfunction probability.

The above aspect is accomplished by a MEMS gyroscope according to the present invention, including a first mass to move in relation to a substrate in a vertical direction of the substrate; a driving electrode disposed on a same surface with the first mass on the substrate, and the driving electrode to drive the first mass in the vertical direction; a second mass to move in relation to the substrate in a horizontal direction that is parallel to the surface, and the second mass to be moved by a Corilois force generated by an angular velocity while the first mass is being vibrated by the driving electrode; and a sensing electrode to measure a displacement in the horizontal direction of the second mass.

The second mass is able to move in the horizontal direction in relation to the first mass. Further provided are at least one first spring to fix the first mass on the substrate for the first mass to be able to move in the vertical direction; and at least one second spring to fix the second mass and the first mass to each other for the second mass to be able to move in relation to the first mass in the horizontal direction.

According to another illustrative, non-limiting embodiment of the present invention, further provided are at least one first spring to fix the first mass and the second mass to each other for the first mass to be able to move in relation to the second mass in the vertical direction and be fixed in relation to the horizontal direction; and at least one second spring to fix the second mass on the substrate for the second mass to be able to move in relation to the substrate in the horizontal direction.

The driving electrode and the sensing electrode have a comb structure. The driving electrode includes: a stationary electrode erect on the substrate; and a moving electrode disposed between each of the fixed walls. The stationary electrode has a plurality of fixed walls formed parallel to each other. The moving electrode has a plurality of moving walls with a shorter height than the fixed walls from the substrate. The stationary electrode is fixed on the substrate, and the moving electrode is fixed to the first mass.

According to the present invention, all moving electrodes and stationary electrodes are disposed on the same surface of the substrate. Accordingly, all elements can be manufactured with a single mask, thus the manufacturing process is simplified.

Further, the distance between the moving electrode and the stationary electrode can be narrowed without causing adhesion of the moving electrode and the stationary electrode. Accordingly, the gyroscope of highly precise control can be realized.

BRIEF DESCRIPTION OF THE DRAWINGS

The above-mentioned aspects and features of the present invention will be more apparent by describing exemplary embodiments of the present invention and referring to the appended drawings, in which.

DETAILED DESCRIPTION OF THE EXEMPLARY EMBODIMENTS

From now on, the present invention will be described in greater detail by referring to the appended drawings.

As mentioned in the description part of the prior art, the direction that a mass is driven in a gyroscope is a 'driving direction,' the direction that angular velocity is input into the gyroscope is an 'input direction' and the direction that Coriolis force generated in the mass is sensed is a 'sensing direction.' Moreover, the direction at a right angle to a surface of a substrate is a 'vertical direction' and the direction parallel to the surface of the substrate is a 'horizontal direction.' In the meantime, the right and left directions of the horizontal direction in the Figures are the 'X direction,' the up and down directions in the Figures are the 'Y direction,' and the vertical direction and 'Z direction' are used as having the same meaning.

Figure 2:
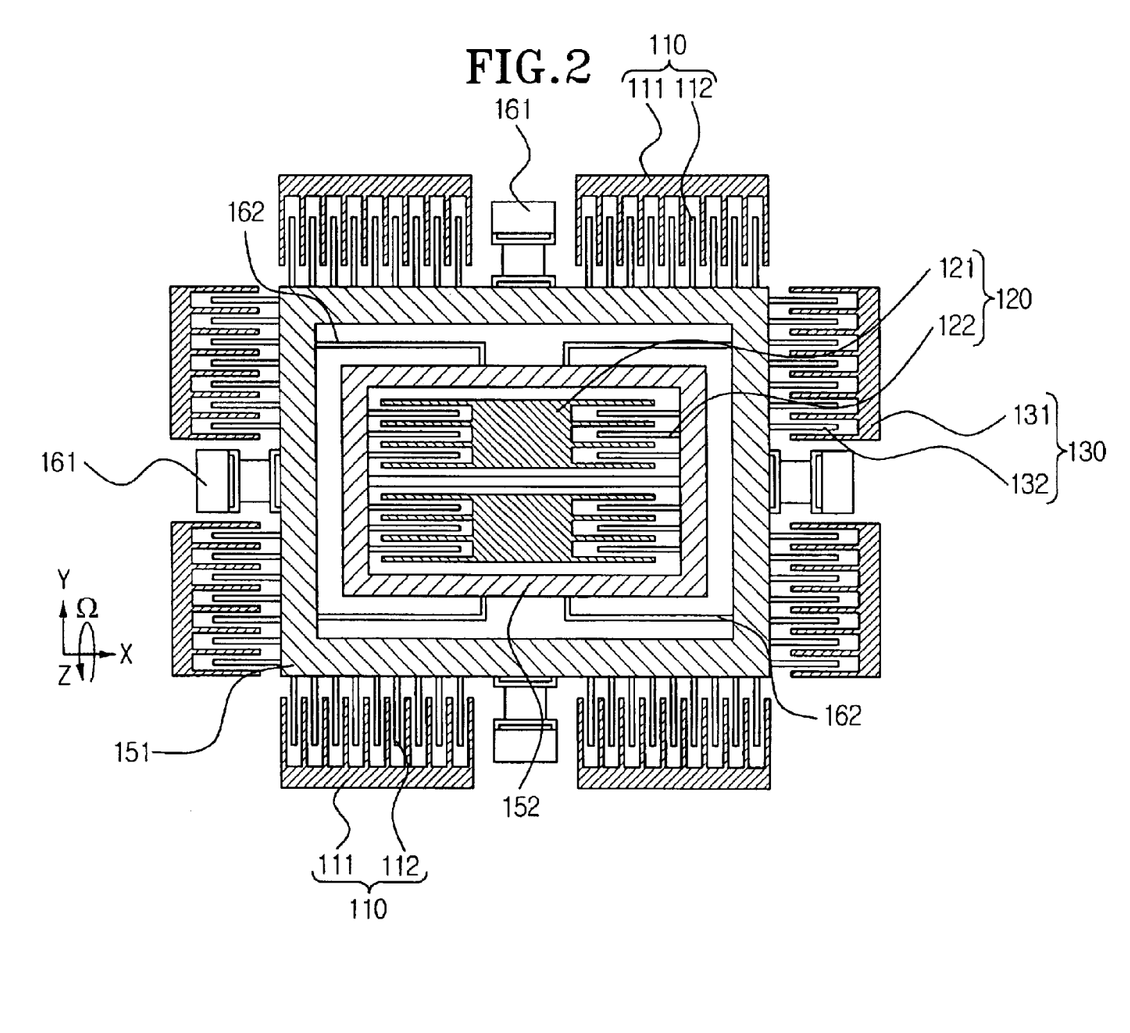
FIG. 2 is a view showing the first exemplary embodiment of a MEMS gyroscope according to the present invention.

FIG. 2 is a view showing the first exemplary embodiment of a MEMS gyroscope according to the present invention.

The MEMS gyroscope according to the present invention has a first mass 151 and a second mass 152 disposed on a substrate (not shown), a driving electrode 110 to drive the first mass 151, a horizontal sensing electrode 120 to sense horizontal displacement of the second mass 152, a vertical sensing electrode 130 to sense vertical displacement of the first mass 151, and a plurality of first springs 161 and a plurality of second springs 162 to respectively support the first mass 151 and the second mass 152.

Figure 3:
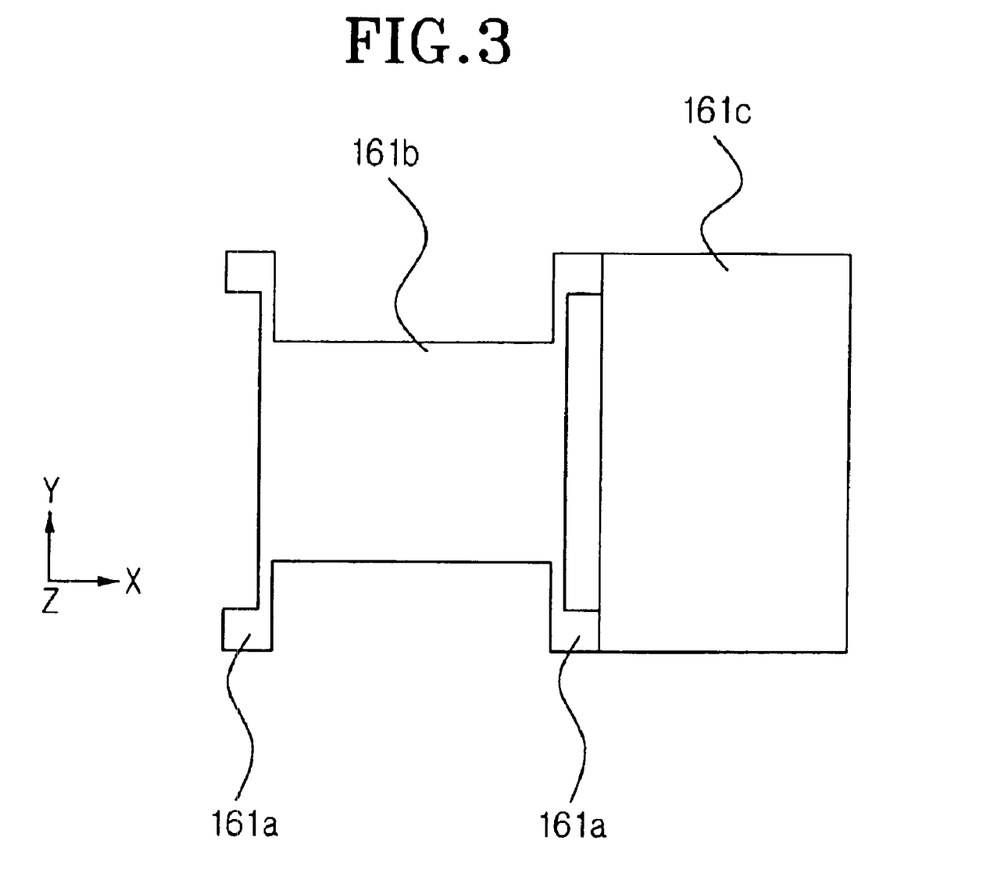
FIG. 3 is an enlarged view of the first spring of FIG. 2.
Figure 4:
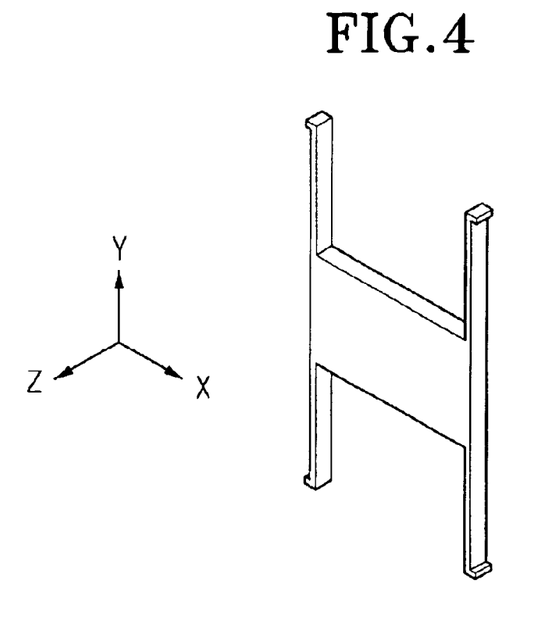
FIGS. 4 and 5 are views showing the original status and the status of torsion of the first spring of FIG. 3.
Figure 5:
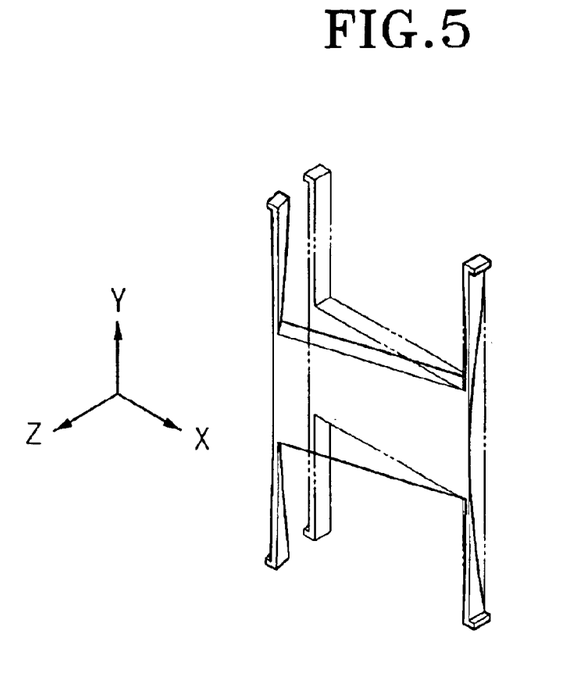

The first mass 151 is a quadrangle frame, and lifted to be able to vibrate on the substrate. Each side of the first mass 151 is fixed on the substrate by the first springs 161. As shown in FIG. 3, the first springs 161 are composed of two plate springs 161a to generate torsion, a connection portion 161b to connect the plate springs 161a, and a fixing portion 161c to fix one of the plate springs 161a to the substrate. FIGS. 4 and 5 are views showing the original status and the status of torsion of the first springs 161 of FIG. 3. The first mass 151 can vertically move in relation to the substrate due to the torsion of the plate springs 161a.

Figure 6:
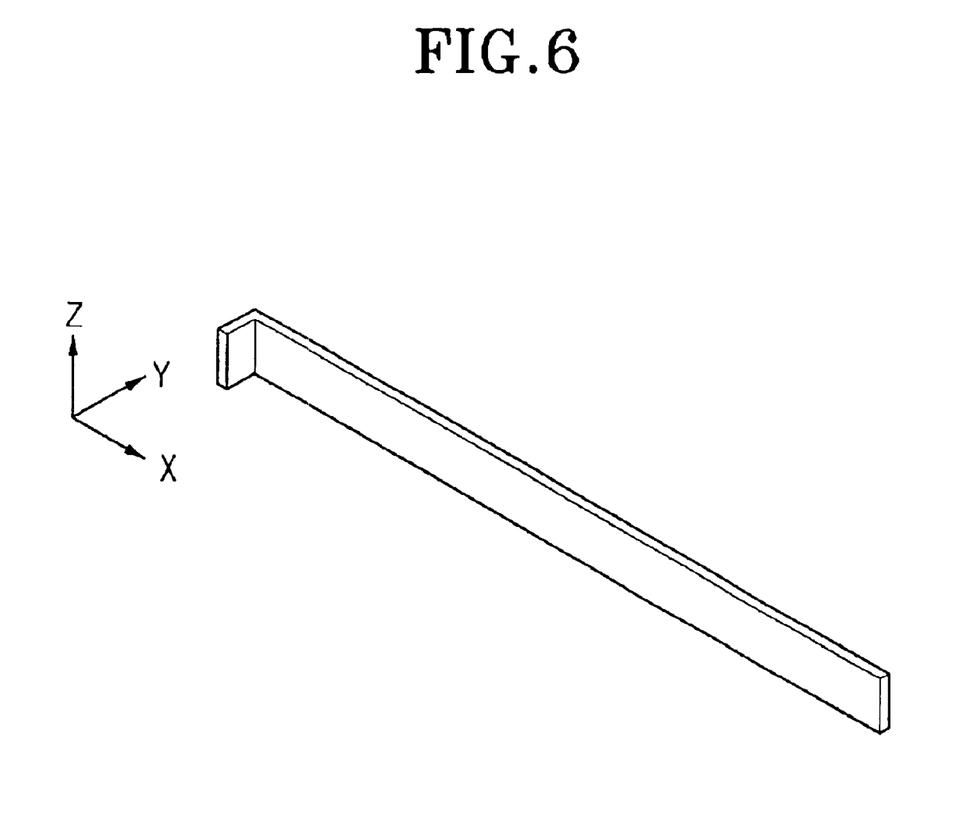
FIG. 6 is an enlarged perspective view showing the second spring of FIG. 2.

The second mass 152 is a quadrangle frame smaller in its size than the first mass 151, and lifted to be able to vibrate on the substrate. The second mass 152 is disposed inside of the first mass 151. The second mass 152 is fixed to the first mass 151 by the second springs 162. As shown in FIG. 6, the second spring 162 is a plate spring bent in the direction Y, accordingly, the second mass 152 is supported by the second spring 162 in order to move in the direction Y in relation to the first mass 151.

The driving electrode 110 is installed at a side of the direction Y of the first mass 151, and disposed on the same surface with the first mass 151 on the substrate. The driving electrode 110 is composed of a stationary electrode 111 and a moving electrode 112 connected with each other through a comb structure.

Figure 7:
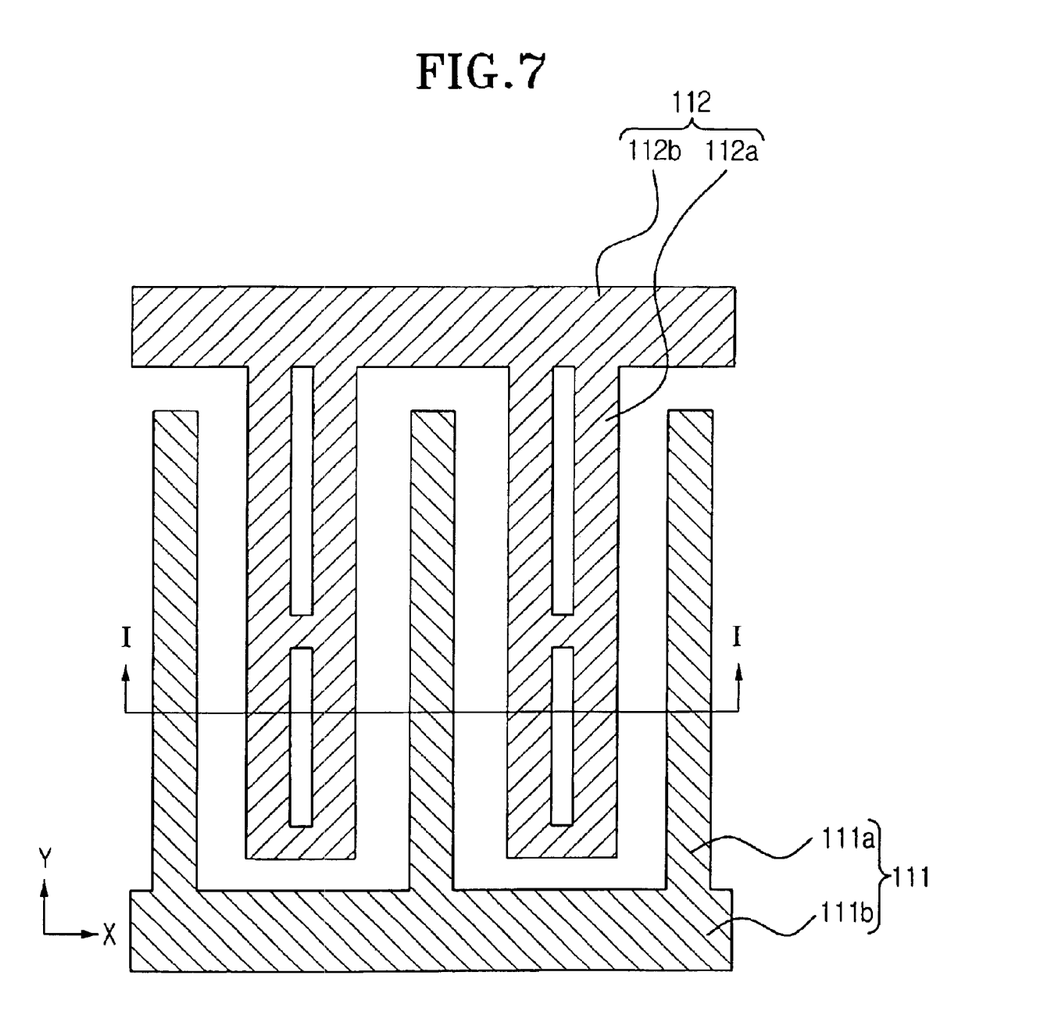
FIG. 7 is a partially enlarged view showing a driving electrode of FIG. 2.

As shown in FIG. 7, the stationary electrode 111 has a fixed portion 111b fixed on the substrate and fixed walls 111a formed integrally with the fixed portion 111b. The fixed walls 111a are installed erect on the substrate and parallel to each other. The moving electrode 112 has fixed portion 112b fixed to the first mass 151 and plate-shaped moving walls 112a formed integrally with the fixed portion 112b. The moving walls 112a are disposed at the space between the fixed walls 111a.

Figure 8:
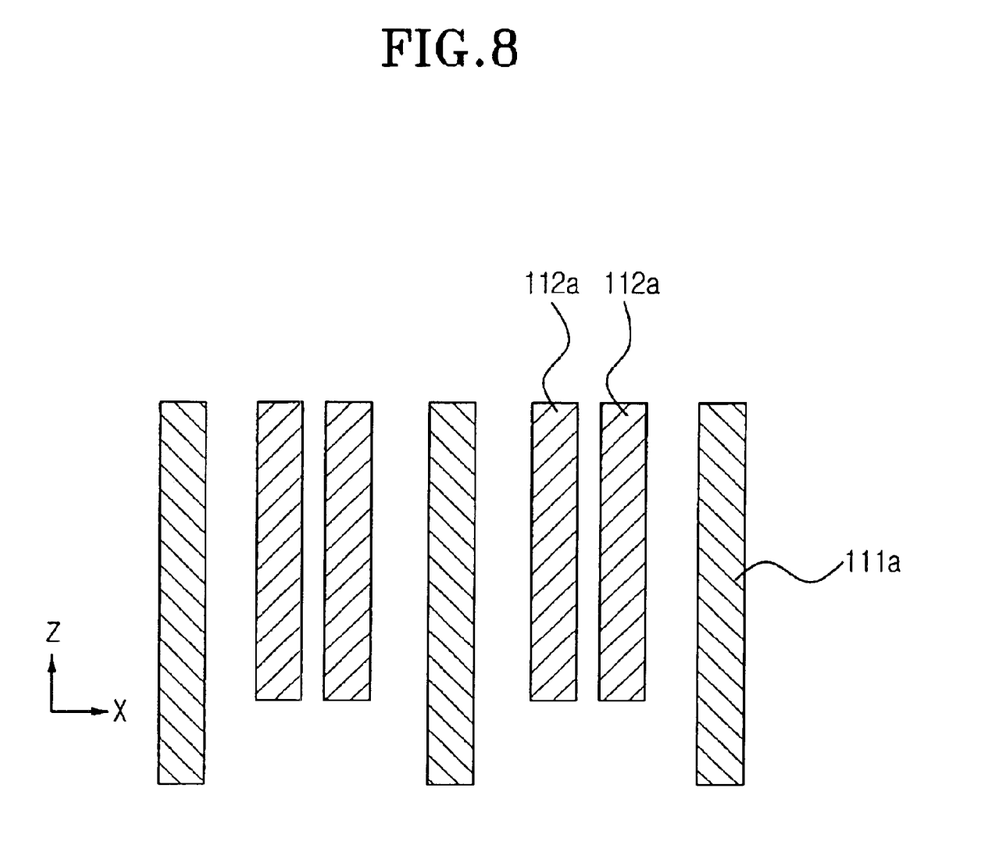
FIG. 8 is a sectional view cut along the I—I line of FIG. 7.

As shown in FIG. 8, the height of the moving walls 112a in the direction Z is shorter than that of the fixed walls 111a, and lower parts of the moving walls 112a are separated from the substrate with a predetermined distance. Accordingly, the moving electrode 112 can vibrate on the substrate.

Horizontal sensing electrodes 120 are installed inside of the second mass 152. The horizontal sensing electrodes 120 have a stationary electrode 121 and a moving electrode 122 connected with each other through the comb structure. The stationary electrode 121 is fixed on the substrate, and the moving electrode 122 is fixed to the second mass 152.

Vertical sensing electrodes 130 are installed at a side of the direction X of the first mass 151. The vertical sensing electrodes 130 are composed of a stationary electrode 131 and a moving electrode 132 connected with each other through the comb structure. The stationary electrode 131 is fixed on the substrate, and the moving electrode 132 is fixed on the first mass 151. The vertical sensing electrodes 130 have the same structure as the driving electrode 110 shown in FIGS. 3 and 4.

Hereinbelow, the operation of the MEMS gyroscope according to the present invention having the above structure will be described.

With the supply of voltage that is varying by time, the first mass 151 is vibrated in the direction Z by electrostatic force generated by the driving electrode 110. At this time, the second mass 152 is fixed in the direction Z in relation to the first mass 151 by the second springs 162, thus the second mass 152 is vibrated with the first mass 151 in the direction Z.

The vertical sensing electrode 130 measures displacement of the first mass 151 in the direction Z, and the measured value is provided to a controller (not shown). The controller controls the electric field provided to the driving electrode 110, which allows the first mass 151 to be effectively vibrated in the direction Z, based on the measured value of the vertical sensing electrode 130.

When angular velocity is applied to the first mass 151 in the direction X while the first mass 151 and the second mass 152 are vibrating, the second mass 152 rotates in the direction X with the first mass 151 by the second spring 162. At this time, the second mass 152 moves in the direction Y as Coriolis force of the direction Y is added to the second mass 152. Accordingly, the distance between the stationary electrode 121 and the moving electrode 122 in the horizontal sensing electrode 120 is changed, and capacitance of the horizontal sensing electrode 120 is changed according to the change of the distance. The controller (not shown) calculates the Coriolis force by using the changed capacitance of the horizontal sensing electrode 120, and thus angular velocity generated by the external force added to the direction X can be calculated.

According to the first exemplary embodiment, the vibration in the direction Z of the first mass 151 is controlled by the driving electrode 110 having the stationary electrode 111 and the moving electrode 112 disposed on the same surface of the first mass 151. Therefore, the driving electrode 110 can be manufactured in the same process when other parts such as the first mass 151 and the second mass 152 are manufactured. Accordingly, the manufacturing process of the gyroscope is simplified since all elements of the gyroscope can be manufactured by using one mask.

In addition, the stationary electrode 111 and the moving electrode 112 are installed on the same surface, thus it is much easier to make the distance between the stationary electrode III and the moving electrode 112 narrower. Accordingly, driving of the first mass 151 and sensing of the displacement of the second mass 152 can be accurately controlled.

Figure 9:
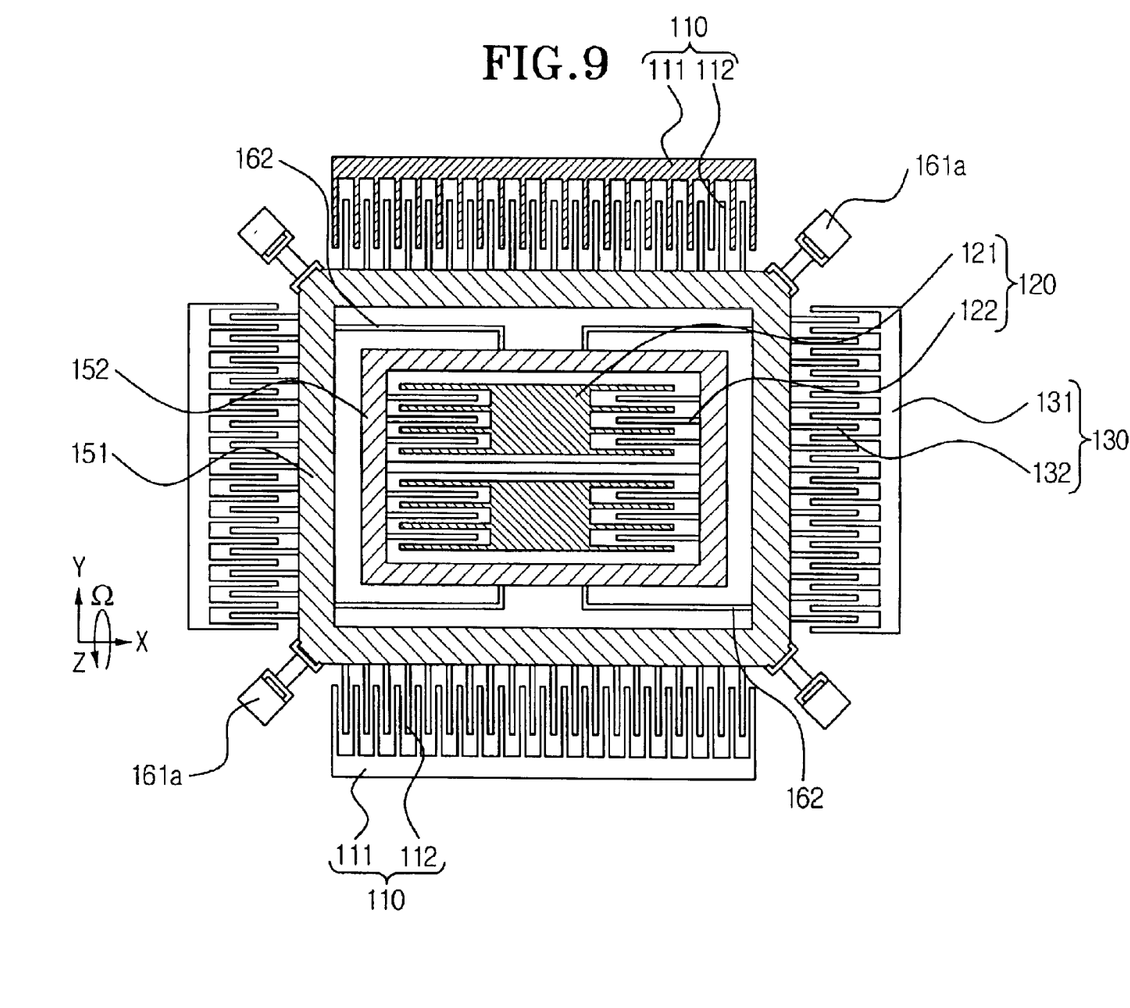
FIG. 9 is a view showing the second exemplary embodiment of a MEMS gyroscope according to the present invention.

FIG. 9 is a second exemplary embodiment of the MEMS gyroscope according to the present invention. In the description of the exemplary embodiment hereinbelow, the same parts shown in FIG. 1 will be given the same reference numerals and the description on the same parts will be omitted.

In the second exemplary embodiment of the present invention, the first mass 151, the second mass 152, the driving electrodes 110, the horizontal sensing electrode 120, the vertical sensing electrodes 130, and the second springs 162 are the same as those shown in FIG. 2. Only the structure of first springs 161a is different from that shown in FIG. 2.

The first springs 161a are disposed at corners of the first mass 151. The first springs 161a support the first mass 151 in order to allow the first mass 151 to vibrate in relation to the substrate in the direction Z as the first springs 161 of FIG. 2 do. The operation of the MEMS gyroscope of FIG. 9 having the above structure is the same as FIG. 2.

As described in the second exemplary embodiment, the first springs 161a support each corner of the first mass 151, thus a resonance mode that would cause the first mass 151 to horizontally rotate can be prevented.

Figure 10:
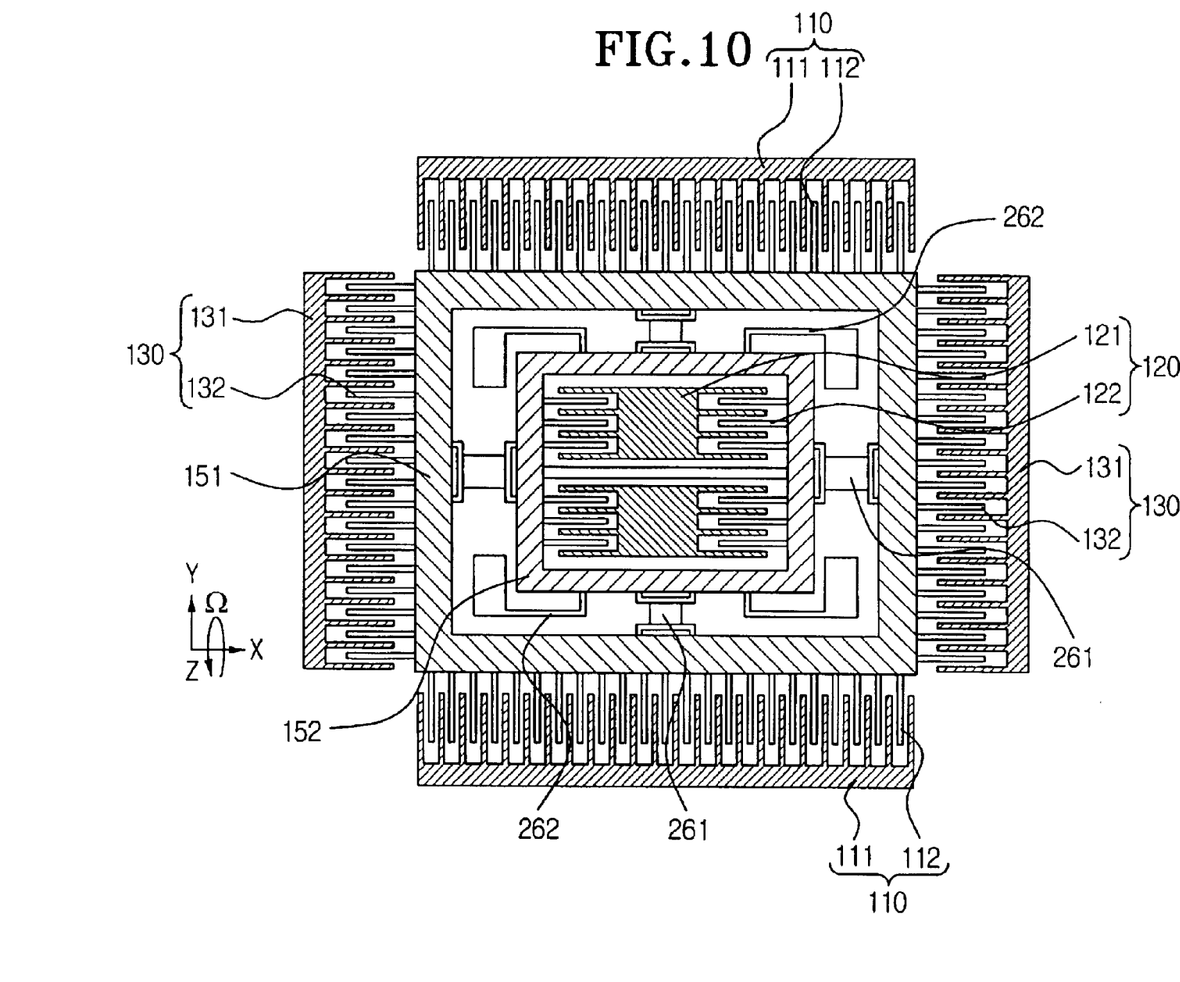
FIG. 10 is a view showing the third exemplary embodiment of a MEMS gyroscope according to the present invention.

FIG. 10 is a view showing the third exemplary embodiment of the MEMS gyroscope according to the present invention.

In the third exemplary embodiment of the present invention, the structure of the first mass 151, the second mass 152, the driving electrode 110, the horizontal sensing electrode 120, and the vertical sensing electrode 130 is the same with the first exemplary embodiment of the present invention. Yet, the structure of first springs 261 and second springs 262 is different than that of the first exemplary embodiment of the present invention.

The first springs 261 fix the first mass 151 and the second mass 152 in relation to each other. The first mass 151 can relatively move in the direction Z in relation to the second mass 152, and is relatively fixed in the horizontal direction by the first springs 261.

The second springs 262 fix the second mass 152 on the substrate. The second mass 152 is fixed on the substrate by the second springs 262, and it is relatively moved in relation to the substrate in the direction Y.

When the first mass 151 vibrates in the direction Z due to the driving electrode 110, the second mass 152 does not vibrate in the direction Z as the second mass 152 is fixed on the substrate in the direction Z by the second springs 262. When the angular velocity is applied to the vibrating first mass 151 in the direction X, the first mass 151 is moved in the direction Y by the Coriolis force generated in the direction Y. The second mass 152 is moved in the direction Y with the first mass 151 as the first mass 151 and the second mass 152 are relatively fixed in the direction Y by the first springs 261. Accordingly, the capacitance of the horizontal sensing electrode 120 is changed.

Figure 11:
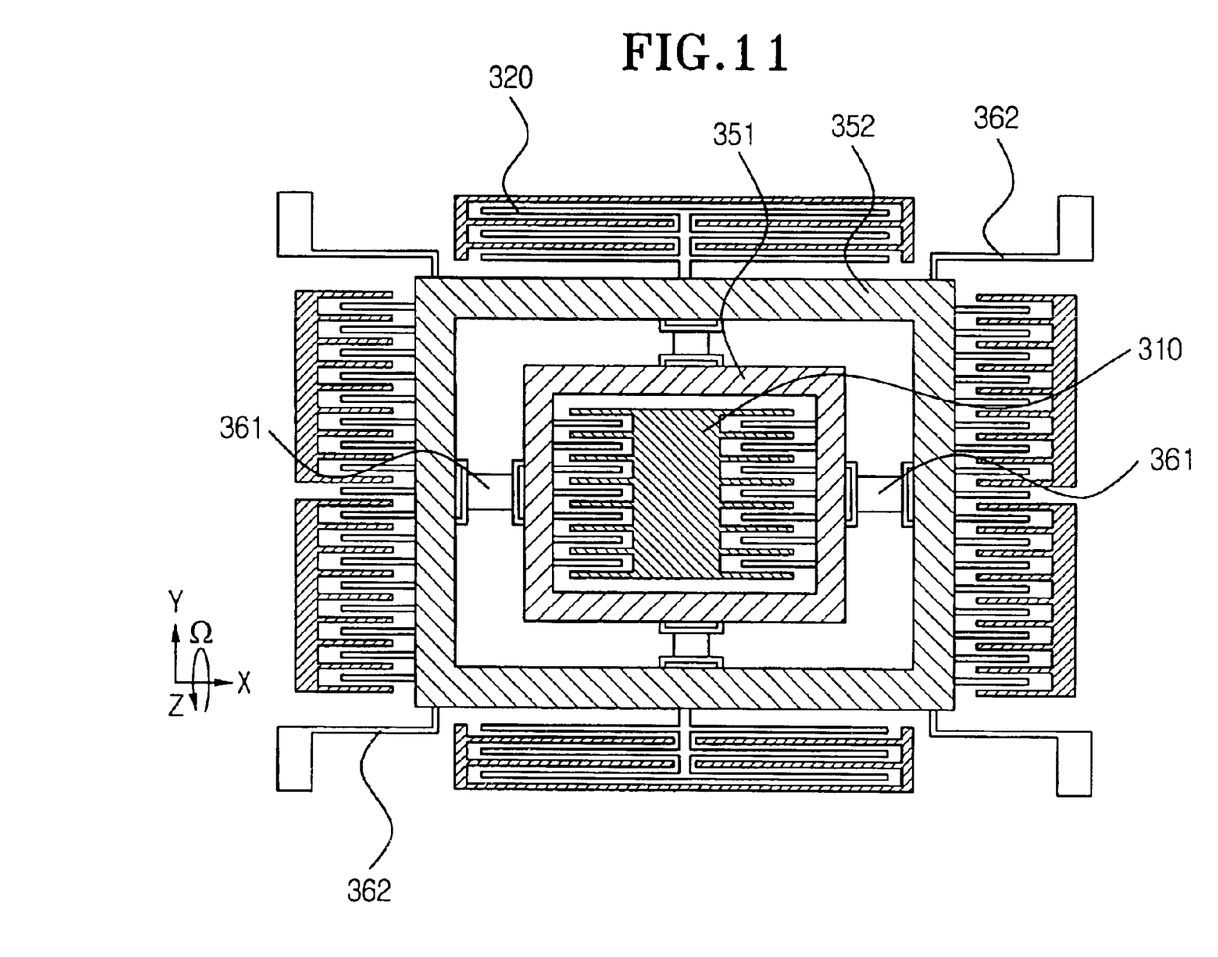
FIG. 11 is a view showing the fourth exemplary embodiment of a MEMS gyroscope according to the present invention.

FIG. 11 is a view showing the fourth exemplary embodiment of the MEMS gyroscope according to the present invention.

In the fourth exemplary embodiment of the present invention, the structure and the operation of each element is substantially the same with the third exemplary embodiment of the present invention shown in FIG. 10. Yet, in the fourth exemplary embodiment, a first mass 351 is installed inside of a second mass 352. Accordingly, a driving electrode 310 to drive the first mass 351 in the direction Z is disposed inside of the first mass 351, and a horizontal sensing electrode 320 to sense the displacement of the second mass 352 in the direction of Y is disposed at an outside of the second mass 352.

The structure of first springs 361 and second springs 362 is substantially the same with the exemplary embodiment shown in FIG. 6. In other words, the first springs 361 fix the first mass 351 and the second mass 352 in relation to each other so that the first mass 351 can move in the direction Z in relation to the second mass 352, and the second springs 362 fix the second mass 352 in order to be moved in relation to the substrate in the direction Y.

The operation of the gyroscope according to the present invention having the above structure is the same with that of the exemplary embodiment shown in FIG. 10. In other words, when the angular velocity is applied to the first mass 351 in the direction X while the first mass 351 is vibrating in the direction Z by the driving electrode 310, the second mass 352 is moved in the direction Y with the first mass 351, and the horizontal sensing electrode 320 senses the movement.

Figure 12:
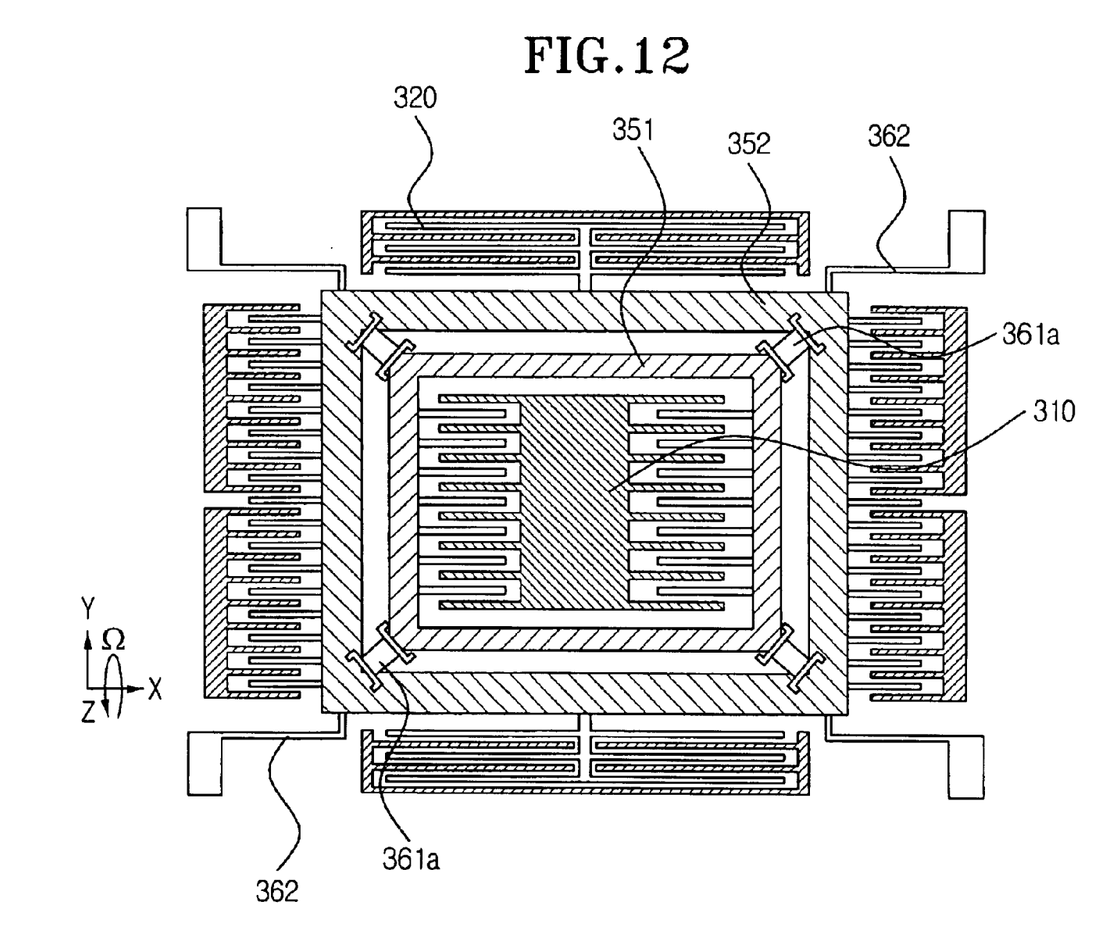
FIG. 12 is a view showing the fifth exemplary embodiment of a MEMS gyroscope according to the present invention.

FIG. 12 is a view showing the fifth exemplary embodiment of the MEMS gyroscope according to the present invention. In the fifth exemplary embodiment of the present invention, the structure of elements except first springs 361*a* is the same with that of the exemplary embodiment shown in FIG. 11.

The first springs 361*a* connect external corners of the quadrangle-shaped first mass 351 and inner corners of the square-shaped second mass 352. Similar to the first springs 361 of FIG. 11, the first springs 361*a* connect the first mass 351 and the second mass 352 in order for the two masses 351 and 352 to move in relation to each other. The operation of the MEMS gyroscope of FIG. 12 having the above structure is the same as that of the MEMS gyroscope of FIG. 11.

In the second exemplary embodiment through the fifth exemplary embodiment, all electrodes are disposed on the same surface on the substrate as the first exemplary embodiment.

According to the present invention, a gyroscope having a mass vertically vibrating and all moving electrodes and stationary electrodes disposed on the same surface of the substrate is provided. All elements can be manufactured with a single mask, thus the manufacturing process is simplified, and the distance between the moving electrode and the stationary electrode can be formed to be narrow without generating adhesion. Accordingly, the X type gyroscope is easily manufactured, and the possibility of malfunction of the X type gyroscope is reduced.

When the X type gyroscope according to the present invention is rotated 90° in the direction of vertical axis and disposed at a right angle on the same surface with the X type gyroscope, it is a Y type gyroscope. Accordingly, a two-axes gyroscope can be manufactured through the same method on the same substrate using the same mask. Besides, the two-axes gyroscope has some advantages such as the same sensitivity, the same signal processing unit, and chip with the same size. Furthermore, when a Z type gyroscope is also disposed, applying the same sensing method with that of the X type gyroscope according to the present invention, a three-axes gyroscope can be easily manufactured on the same surface on the same substrate with one mask.

So far, the exemplary embodiments of the present invention have been illustrated and described. However, the present invention is not limited to the exemplary embodiments described here, and one skilled in the art can modify the present invention without distorting the point of the present invention claimed in the claim part.

What is claimed is:

1. A MEMS (micro electro mechanical system) gyroscope comprising:

a first mass which moves in relation to a substrate in a vertical direction of the substrate;

a driving electrode disposed on a same surface with the first mass on the substrate, the driving electrode being operative to drive the first mass in the vertical direction;

a second mass which moves in relation to the substrate in a horizontal direction that is parallel to the surface, the second mass being operative to be moved by a Coriolis force generated by an angular velocity applied while the first mass is being vibrated by the driving electrode;

a sensing electrode which measures a displacement in the horizontal direction of the second mass;

at least one first spring to fix the first mass and the second mass to each other for the first mass to be able to move in relation to the second mass in the vertical direction and be fixed in relation to the horizontal direction; and at least one second spring to fix the second mass on the substrate for the second mass to be able to move in relation to the substrate in the horizontal direction.

2. The MEMS gyroscope of claim 1, wherein the driving electrode and the sensing electrode have a comb structure.

3. The MEMS gyroscope of claim 1, further comprising a vertical sensing electrode to sense a displacement in the vertical direction of the first mass moved by the driving electrode.

4. The MEMS gyroscope of claim 3, wherein the vertical sensing electrode includes:

a stationary electrode erect on the substrate, having a plurality of fixed walls formed parallel to each other, and fixed on the substrate; and a moving electrode disposed between each of the fixed walls, having a plurality of moving walls with a shorter height than the fixed walls from the substrate, and fixed to the first mass.

5. The MEMS gyroscope of claim 3, further comprising a controller which controls an electric field provided to the driving electrode, wherein the controller controls movement of the first mass in the vertical direction based on a measured value of the vertical sensing electrode.

6. The MEMS gyroscope of claim 1, wherein the first mass comprises a substantially polygonal frame.

7. The MEMS gyroscope of claim 6, wherein the second mass comprises a substantially polygonal frame smaller in size than the first mass.

8. The MEMS gyroscope of claim 7, wherein the second mass is disposed inside of the first mass.

9. The MEMS gyroscope of claim 6, wherein the second mass comprises a substantially polygonal frame larger in size than the first mass.

10. The MEMS gyroscope of clam 9, wherein the first mass is disposed inside of the second mass.

11. The MEMS gyroscope of claim 1, wherein the second mass is fixed on the substrate by plate springs; and wherein the second mass can move in a horizontal direction in relation to the substrate due to a torsion of the plate springs.

12. The MEMS gyroscope of claim 1, further comprising a controller which calculates the Coriolis force by using changed capacitance of the horizontal sensing electrode.

13. The MEMS gyroscope of claim 12, wherein the controller calculates an angular velocity generated by an external force that is applied by using the Coriolis force calculation.

14. The MEMS gyroscope of claim 1, further comprising a plurality of springs which fix the first mass and the second mass to each other, wherein the first springs are disposed at corners of the first mass.

* * * * *